(12) United States Patent
Ito (10) Patent No.: US 10,462,555 B2
(45) Date of Patent: Oct. 29, 2019

(54) IN-VEHICLE SPEAKER (71) Applicant: ALPINE ELECTRONICS, INC., Tokyo (JP)

(72) Inventor: Ryo Ito, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/247,896

(22) Filed: Jan. 15, 2019

(65) Prior Publication Data
US 2019/0222922 A1  Jul. 18, 2019

(30) Foreign Application Priority Data

Jan. 18, 2018 (JP) .................. 2018-006360

(51) Int. Cl.
| | | |
|---|---|---|
| *H04R 1/28* | (2006.01) | |
| *H04R 9/06* | (2006.01) | |
| *H04R 7/16* | (2006.01) | |
| *H04R 1/02* | (2006.01) | |
| *B60R 11/02* | (2006.01) | |

(52) U.S. Cl.
CPC ........ *H04R 1/2849* (2013.01); *B60R 11/0217* (2013.01); *H04R 1/026* (2013.01); *H04R 7/16* (2013.01); *H04R 9/06* (2013.01); *H04R 2499/13* (2013.01)

(58) Field of Classification Search
CPC ........ H04R 1/2849; H04R 1/026; H04R 7/16; H04R 9/06; H04R 2499/13; B60R 11/0217
See application file for complete search history.

(56) References Cited

U.S. PATENT DOCUMENTS

2003/0081808 A1* 5/2003 Kemmerer ............. H04R 9/022
　　　　　　　　　　　　　　　　　　　　　　381/397
2007/0116322 A1* 5/2007 Horigome ................ H04R 7/16
　　　　　　　　　　　　　　　　　　　　　　381/396

FOREIGN PATENT DOCUMENTS

| EP | 2728898 A1 | 5/2014 |
|---|---|---|
| JP | 1991-059791 A | 6/1991 |
| JP | 0359791 U | 6/1991 |
| KR | 101776773 B1 | 9/2017 |

OTHER PUBLICATIONS

Extended European Search Report, dated Mar. 1, 2019 issued in corresponding European Application No. 19 15 2271.3.

* cited by examiner

*Primary Examiner* — Joshua Kaufman
(74) *Attorney, Agent, or Firm* — Brinks Gilson & Lione (57) ABSTRACT

An opening portion is formed along an outer peripheral edge of a diaphragm in a second casing portion partitioned by the diaphragm. In the opening portion, a plurality of fins is arranged at regular intervals, and an air passage is formed between every adjacent two of the fins. The fin and the air passage are formed so as to be at an angle to a corresponding imaginary line that extends from the vibration center line of the diaphragm in the radial direction. By forming each of the air passages obliquely, noise generated by an air flow due to sound pressure is reduced.

4 Claims, 10 Drawing Sheets

IN-VEHICLE SPEAKER

RELATED APPLICATIONS

The present application claims priority to Japanese Patent Appln. No. 2018-006360, filed Jan. 18, 2018, the entire disclosure of which is hereby incorporated by reference.

BACKGROUND

1. Field of the Disclosure

The present disclosure relates to an in-vehicle speaker including a diaphragm and a magnetic drive unit enclosed in a casing.

2. Description of the Related Art

An invention relating to an in-vehicle speaker mounting system is described in Japanese Unexamined Utility Model Registration Application Publication No. 3-59791. The mounting system is attached to a hole formed in a rear tray where the speaker opening is. The rear tray has its front surface facing the vehicle interior and its rear face facing the trunk room. The rear portion of the speaker is inserted into the hole of the rear tray from the vehicle interior side such that a flange portion of the speaker is brought into contact with the surface of the rear tray. The flange portion of the speaker is fixed to the rear tray by screws.

A spacer is fixed to the rear surface of the rear tray. The spacer has a tubular body and a bottom portion of the body and a flange portion formed around the opening periphery of the body, which integrally form the body. The spacer is installed on the rear face of the rear tray from the trunk room side such that the back surface of the speaker is located inside the body. The flange portion is brought into contact with the rear surface of the rear tray and is fixed to the rear surface of the rear tray. A plurality of slits are formed in the body of the spacer. These slits can prevent the occurrence of muffled sound although a bottomed tubular spacer is used.

SUMMARY

In the in-vehicle speaker mounting system described in Japanese Unexamined Utility Model Registration Application Publication No. 3-59791, the rear portion of the speaker protruding from the rear tray into the trunk room is covered and protected by the bottomed tubular spacer. Consequently, the sound pressure generated by vibration of the diaphragm of the speaker is transferred to the trunk room through the slits formed in the body. According to the structure, if the opening width of the slit is small, air flow noise is easily generated by the air passing through the slits due to a change in sound pressure. Thus, noise may be given to a silent vehicle interior. In contrast, if the opening width of the slit is large, dust will easily enter the spacer through the slit, resulting in a decrease in the protection performance of the spacer.

To address the above-described problem of the existing technology, the present disclosure provides an in-vehicle speaker capable of increasing the dust-proof effect of the casing that encloses a diaphragm and a magnetic drive unit and, in addition, reducing the occurrence of air flow noise caused by the sound pressure generated by vibration of the diaphragm.

In one form of the present disclosure, an in-vehicle speaker includes a casing, a frame member enclosed in the casing, and a diaphragm enclosed in the casing, where the outer peripheral portion of the diaphragm is supported by the frame member, and a magnetic drive unit enclosed in the casing, where the magnetic drive unit drives the diaphragm. The inside of the casing is separated into a sound producing space and an antiphase space by the diaphragm serving as a boundary, and the casing is partitioned into a first casing that forms the sound producing space therein and a second casing that forms the antiphase space therein. The first casing has a sound emitting port that enables the sound producing space to communicate with an interior space of a vehicle. The second casing includes a lid portion located in front of the diaphragm in a vibration direction to cover the diaphragm and an opening portion that opens along a peripheral portion of the lid portion, and the opening portion enables the antiphase space to communicate with a non-interior space of the vehicle. A plurality of fins is arranged at regular intervals in the opening portion along the peripheral portion of the lid portion, an air passage is formed between every adjacent two of the fins, and at least part of the air passage extends at an angle to an imaginary line extending from the center of the diaphragm in a radial direction.

In some implementations, it is desirable that a facing inner surface of each of the fins located on either side of the air passage have an outer end portion adjacent to the non-interior space of the vehicle, and a facing distance L between the outer end portions of the facing inner surfaces be greater than the smallest facing distance W between the facing inner surfaces.

In some implementations, it is desirable that both of the facing inner surfaces of the fins located on either side of the air passage be flat surfaces, and a facing distance between the facing inner surfaces gradually increase from the inside of the second casing toward the non-interior space of the vehicle.

In some implementations, at least part of the facing inner surface of each of the fins located on either side of the air passage may be curved from the inside of the second casing toward the non-interior space of the vehicle.

In some implementations, the sound pressure caused by the vibration of the diaphragm is transferred to the interior of the vehicle through the sound emitting port formed in the first casing portion. The second casing portion is provided with the lid portion that covers the diaphragm. In the opening portion that opens along the peripheral portion of the lid portion, a plurality of fins and an air passage between every adjacent two of the fins are formed. The structure can prevent dust, for example, from entering the inside of the second casing portion.

In addition, since at least part of the air passage is at an angle to the imaginary line extending form the center of the diaphragm in the radial direction, the flow rate of the air passing through the air passage is reduced. As a result, air flow noise can be reduced.

DETAILED DESCRIPTION OF THE DRAWINGS

Figure 1:
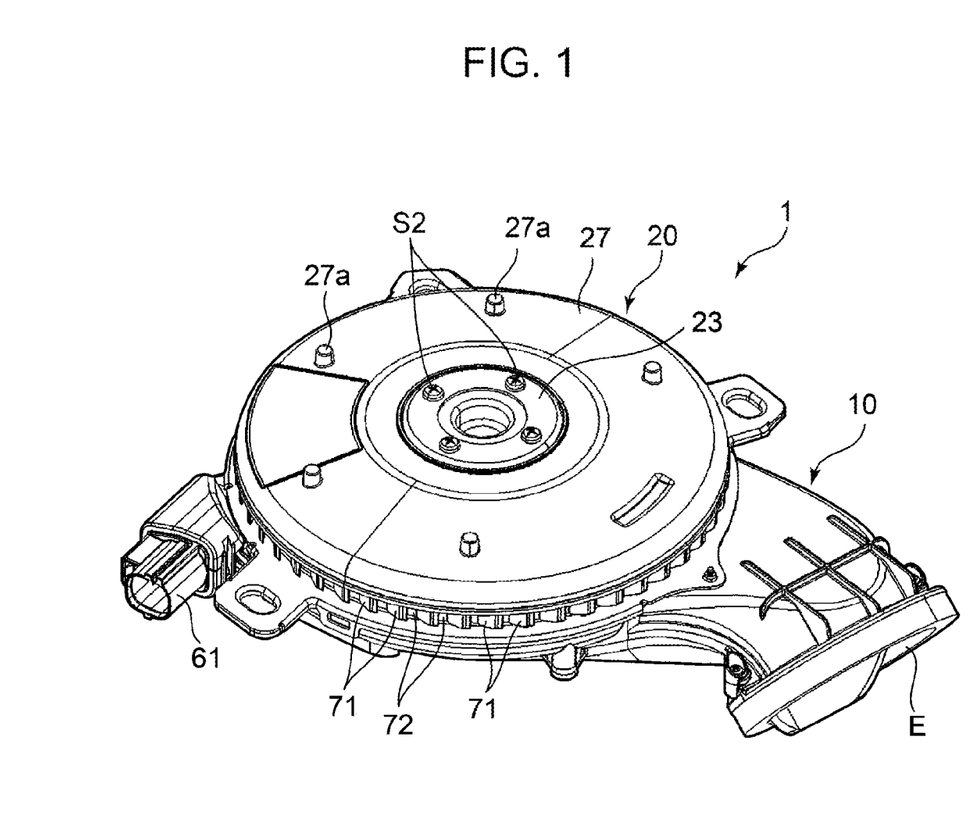
FIG. 1 is a perspective view of one implementation of an in-vehicle speaker.
Figure 2:
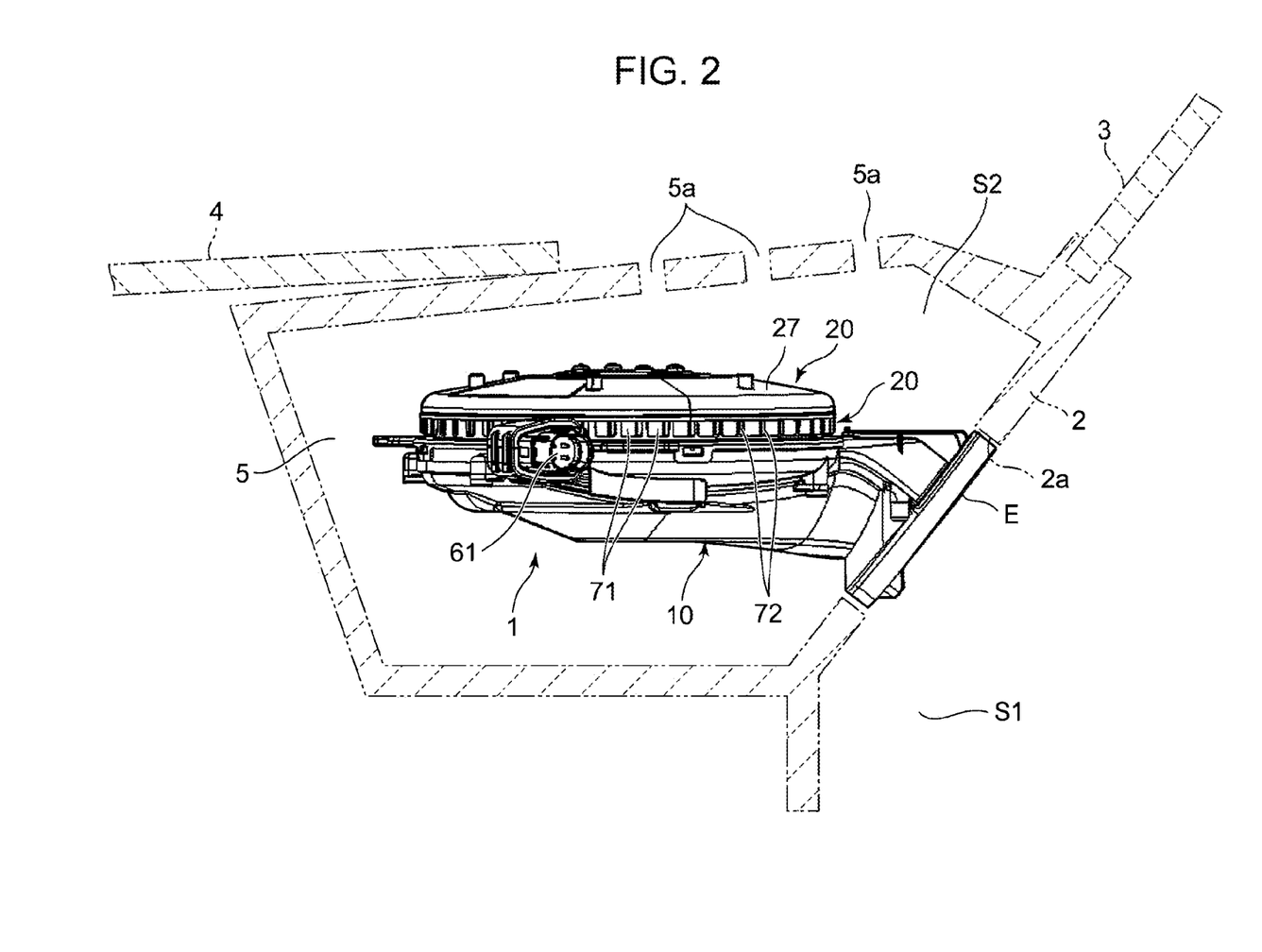
FIG. 2 is a diagram illustrating the in-vehicle speaker of FIG. 1 mounted in the vehicle body.

FIG. 1 illustrates an example of an in-vehicle speaker 1, and FIG. 2 illustrates an example of how to mount the in-vehicle speaker 1 according to one implemenation of the present disclosure.

FIG. 2 is an enlarged sectional view of a front portion of a body of an automobile (a vehicle body). In the front portion of the vehicle body, an interior space S1 and a non-interior space S2 (such as an engine room) of the vehicle are partitioned by a partition wall 2. A lower end portion of a windshield 3 is supported by the upper portion of the partition wall 2, and the interior space S1 of the vehicle is shielded from a space outside the vehicle interior and in front of the vehicle by the windshield 3. In a border portion between the rear portion of a hood 4 and the lower portion of the windshield 3, a cowl box 5 is provided. In the cowl box 5, a drive mechanism for driving the windshield wiper is disposed. The in-vehicle speaker 1 is disposed in the cowl box 5 which is part of the non-interior space S2 of the vehicle, and a sound emitting port E of the in-vehicle speaker 1 communicates with the interior space S1 of the vehicle through an opening 2a of the partition wall 2.

Figure 3:
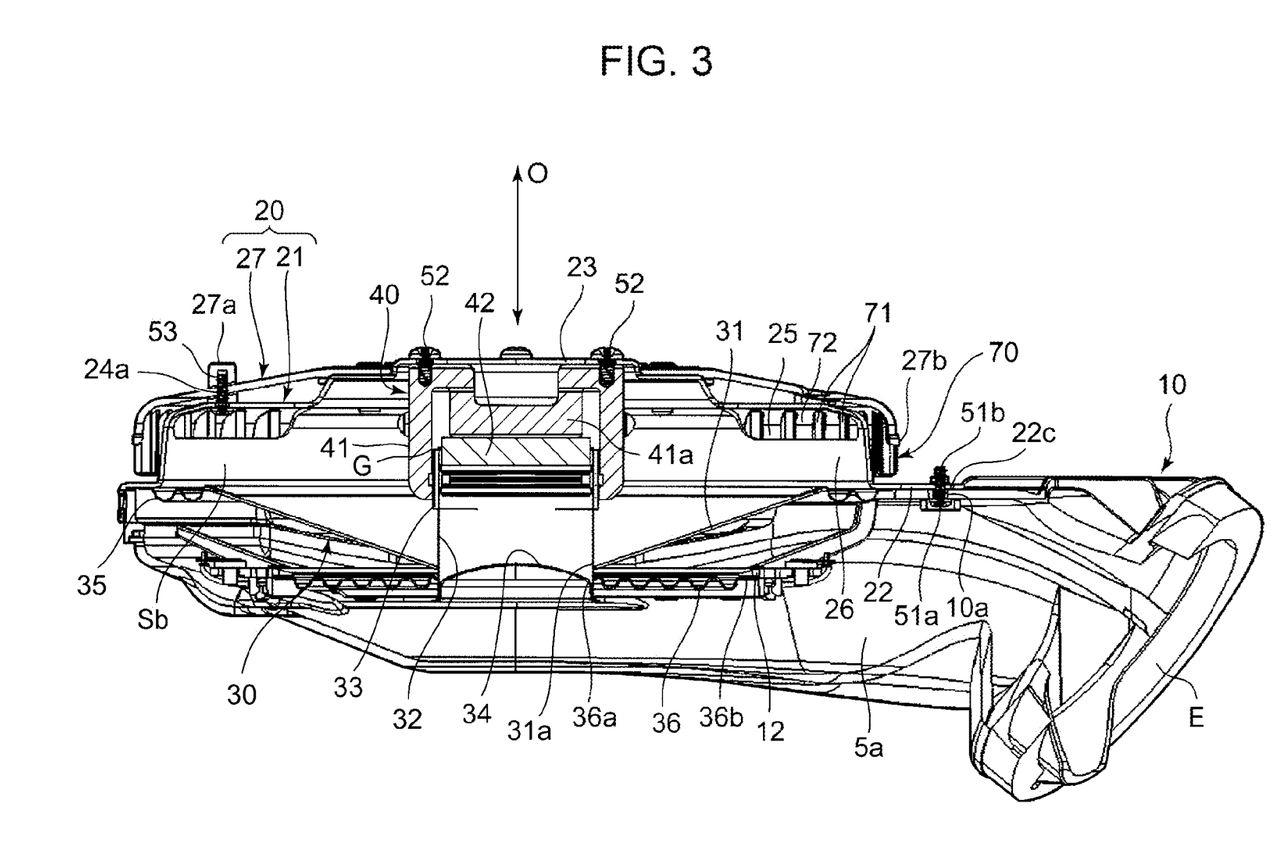
FIG. 3 is a cross-sectional view of the in-vehicle speaker illustrated in FIG. 1.
Figure 4:
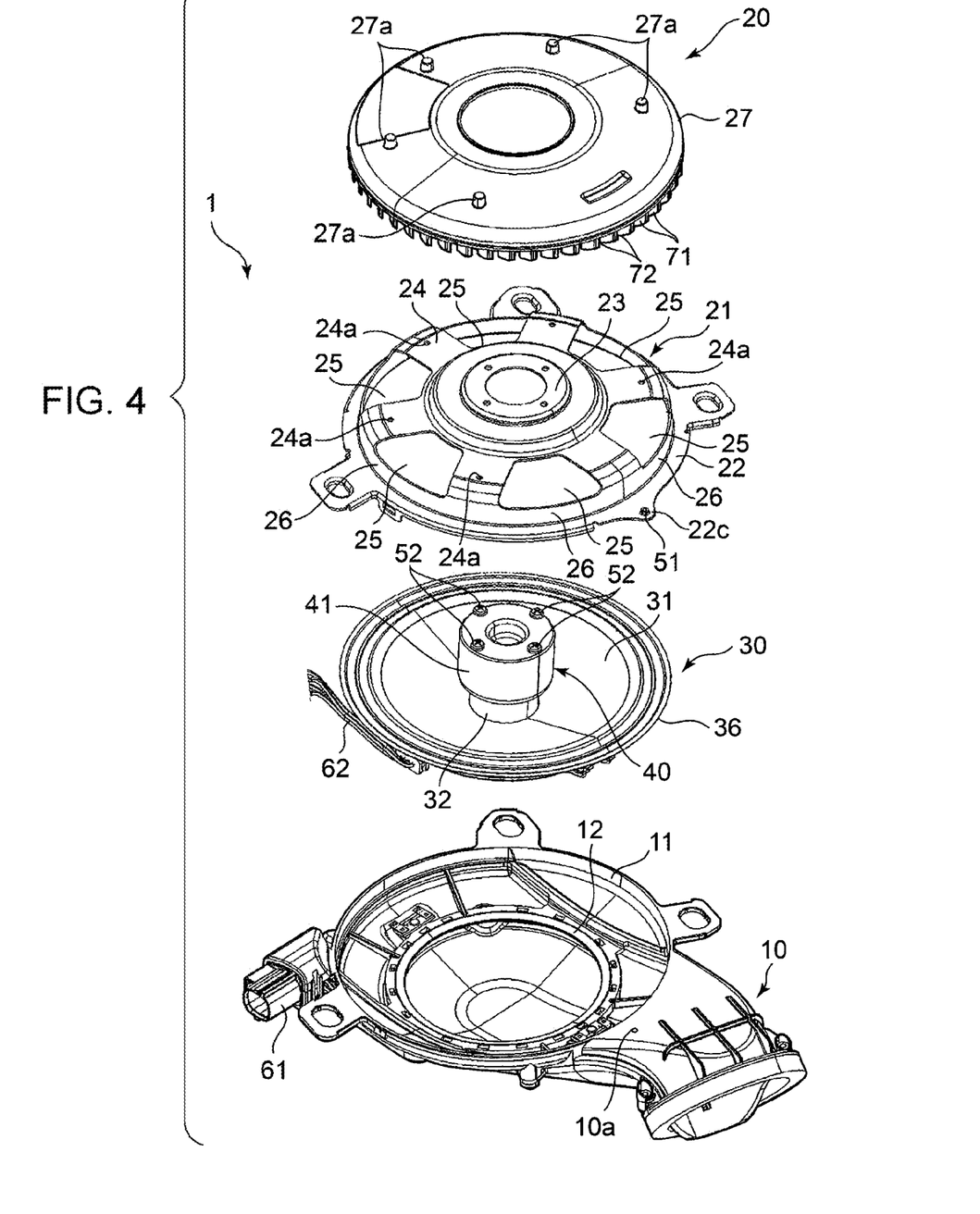
FIG. 4 is an exploded perspective view of the in-vehicle speaker illustrated in FIG. 1.

FIG. 3 and FIG. 4 illustrate the structure of the in-vehicle speaker 1. The in-vehicle speaker 1 has a casing. The casing is formed by connecting a first casing portion 10, which is a lower casing, to a second casing portion 20, which is an upper casing. A sound producing unit 30 is provided between the first casing portion 10 and the second casing portion 20.

As illustrated in FIG. 3, the sound producing unit 30 has a conical diaphragm 31. The diaphragm 31 has a hole 31a formed in the central portion thereof, and the border of the hole 31a is bonded and fixed to the outer peripheral surface of the cylindrical bobbin 32. Around the outer peripheral surface of the upper portion of the bobbin 32, a voice coil 33 is wound. The lower open end of the bobbin 32 (in the lower section of FIG. 3) is closed by a cap member 34. As illustrated in FIG. 4, a connector portion 61 is provided in the first casing portion 10, and a wiring portion 62 extending from the voice coil 33 is connected to the connector portion 61.

Figure 5:
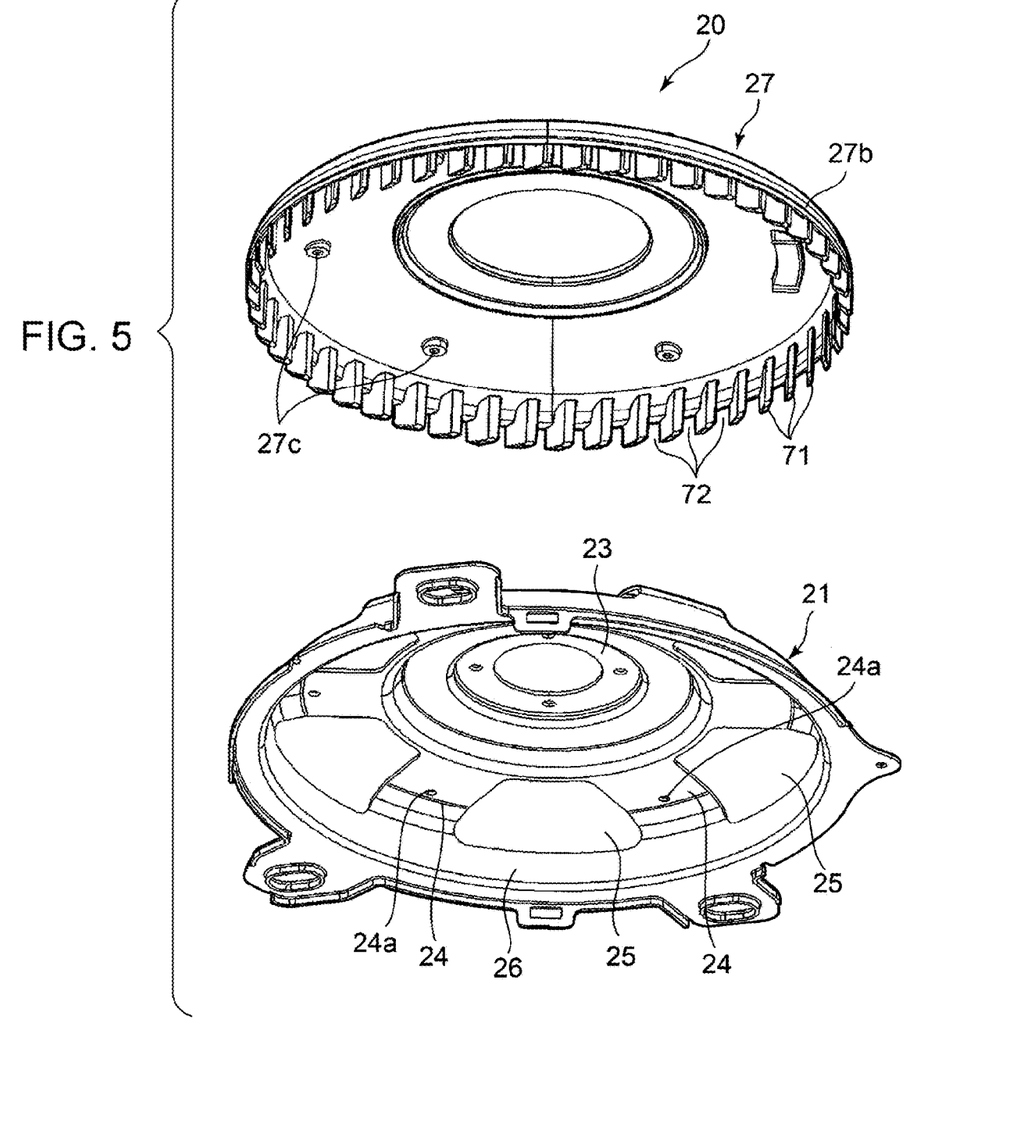
FIG. 5 is an exploded perspective view of a frame member and a second casing portion of the in-vehicle speaker illustrated in FIG. 1 as viewed from below.

As illustrated in FIG. 3, FIG. 4 and FIG. 5, the second casing portion 20 is formed by placing the lid portion 27 on top of a frame member 21 positioned thereunder. The frame member 21 is formed of a metal plate or a synthetic resin material. A deformable edge member 35 is joined to the outer peripheral portion of the diaphragm 31. The outer peripheral portion of the edge member 35 is bonded and fixed to the lower surface of a flange portion 22 formed on the outer periphery of the frame member 21.

The first casing portion 10 is formed of a synthetic resin material. As illustrated in FIG. 4, the first casing portion 10 has a circular opening 11 formed therein. In FIG. 4, the circular opening 11 opens upward. The frame member 21 having the edge member 35 joined thereto is disposed so as to cover the opening 11. The flange portion 22 of the frame member 21 is mounted, from above, on the periphery of the opening 11 of the first casing portion 10. The first casing portion 10 has a fixing hole 10a formed therein, and the flange portion 22 of the frame member 21 has a fixing hole 22c formed therein. As illustrated in FIG. 3, a bolt 51a is inserted into the fixing hole 10a and the fixing hole 22c. Thereafter, a nut 51b is tightened to the inserted bolt 51a. Thus, the first casing portion 10 and the flange portion 22 are fixed to each other.

As illustrated in FIG. 3, the first casing portion 10 has a damper member 36 provided thereinside. The damper member 36 having a corrugated cross section is formed so as to be elastically deformable. The damper member 36 has an inner peripheral portion 36a, which is bonded and fixed to the outer peripheral surface of the bobbin 32. The damper member 36 further has an outer peripheral portion 36b, which is fixed to a damper support portion 12 formed in a flange shape at the bottom portion of the first casing portion 10 (refer to FIG. 4). The diaphragm 31 and the bobbin 32 bonded to the diaphragm 31 are supported by the edge member 35 and the damper member 36 in a vibrating manner in the vertical direction in FIG. 3. In FIG. 3, a vibration center line O of the diaphragm 31 is illustrated.

As illustrated in FIG. 3 and FIG. 4, the sound producing unit 30 includes a magnetic drive unit 40. The magnetic drive unit 40 includes a magnetic yoke 41. As illustrated in FIG. 4, a drive support portion 23 is integrally formed at the center of the frame member 21. An upper surface portion of the magnetic yoke 41 is brought into contact with the lower surface of the drive support portion 23, and the upper surface of the magnetic yoke 41 is fixed to the drive support portion 23 by a plurality of fixing screws 52. As illustrated in FIG. 3, the magnetic yoke 41 has a cylindrical shape with a central support portion 41a protruding downward inside thereof. A magnet 42 is fixed to the lower portion of the central support portion 41a. A magnetic gap G is formed between the outer circumferential surface of the magnet 42 and the inner circumferential surface of the cylindrical magnetic yoke 41 in the magnetic drive unit 40. The upper portion of the bobbin 32 and the voice coil 33 are inserted into the magnetic gap G.

As illustrated in FIG. 4 and FIG. 5, a plurality of spoke portions 24 each radially extending from the drive support portion 23 toward the flange portion 22 are integrally formed in the frame member 21 so that a ventilation opening 25 is formed between every adjacent two of the spoke portions 24. A mounting hole 24a is formed in each of the spoke portions 24 of the frame member 21. The lid portion 27 has protruding portions 27a formed thereon. As illustrated in FIG. 5, a female screw hole 27c that opens downward is formed in each of the protruding portions 27a. The lid portion 27 is placed on top of the frame member 21. As illustrated in FIG. 3, a fixing screw 53 inserted into each of the mounting holes 24a is screwed into one of the female screw holes 27c, so that the frame member 21 and the lid portion 27 are fixed to each other.

As illustrated in FIG. 3, the inside of the in-vehicle speaker 1 is partitioned into two spaces by the diaphragm 31 serving as the boundary between the two spaces. The space under the diaphragm 31 is a sound producing space Sa, and the space above the diaphragm 31 is an antiphase space Sb. The sound producing space Sa is the internal space of the first casing portion 10, and the antiphase space Sb is the internal space of the second casing portion 20. The diaphragm 31, the edge member 35, and the cap member 34 are non-breathable and, thus, the sound producing space Sa and the antiphase space Sb are isolated from each other.

As illustrated in FIG. 2, the sound producing space Sa inside the first casing portion 10 communicates with the interior space 51 of the vehicle through the sound emitting port E formed in the first casing portion 10.

Figure 6:
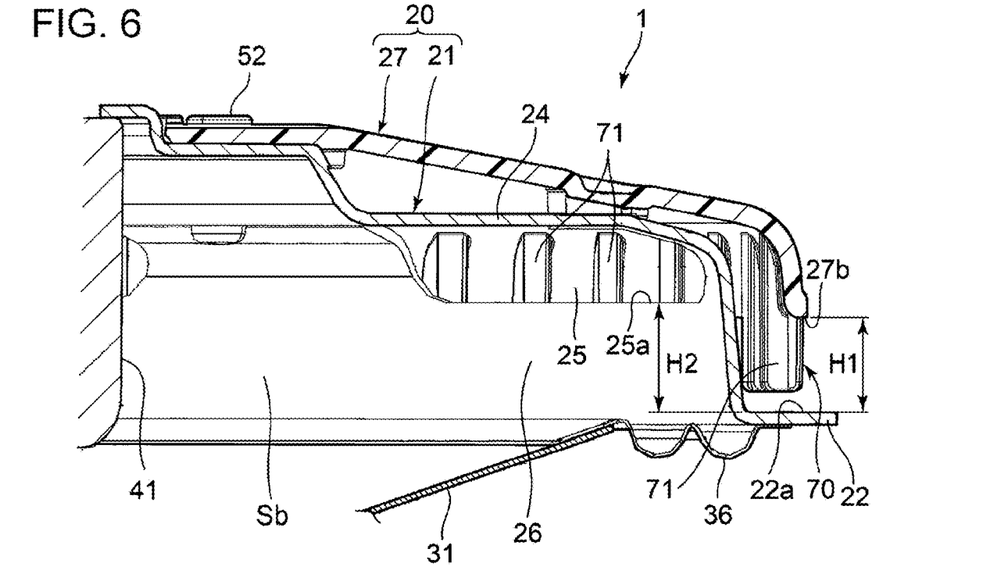
FIG. 6 is a partial enlarged cross-sectional view of the second casing portion of the in-vehicle speaker illustrated in FIG. 1.
Figure 7:
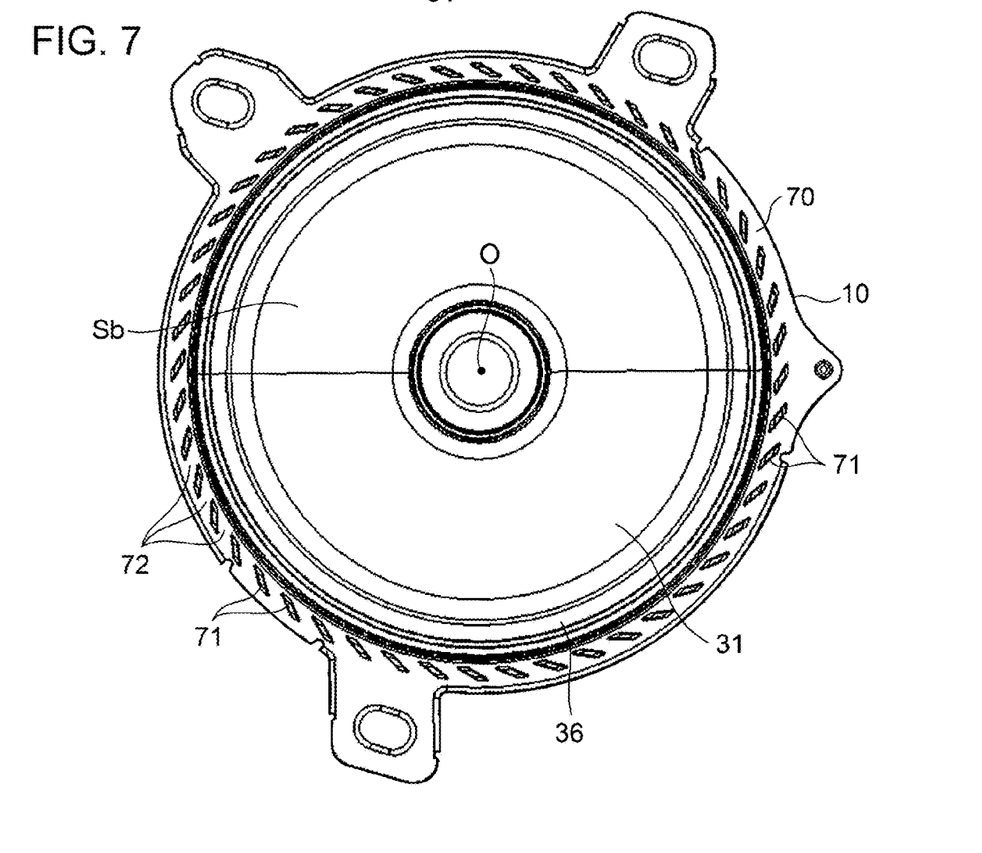
FIG. 7 is a plan cross-sectional view of an opening portion, fins, and air passages of the second casing portion of the in-vehicle speaker illustrated in FIG. 1.

As illustrated in FIG. 1, FIG. 3, and FIG. 6, an opening portion 70 is formed between the flange portion 22 of the frame member 21 and a lower edge portion 27b of the lid portion 27. An opening portion 70 opens along the peripheral portion of the lid portion 27 at the center of which there is the vibration center line O. The opening portion 70 also opens along the outer periphery of the diaphragm 31. As illustrated in FIG. 7, when viewing the in-vehicle speaker 1 from above, the opening portion 70 opens in a circular shape at the center of which there is the vibration center line O. In the opening portion 70, the direction in which the air moves between the anti-phase space Sb and the non-interior space S2 of the vehicle is the radiation direction orthogonal to the vibration center line O.

As illustrated in FIG. 4 and FIG. 5, the frame member 21 has an inner wall portion 26 formed between the flange portion 22 and each of the ventilation openings 25. The inner wall portion 26 is formed so as to extend substantially along the cylindrical surface at the center of which there is the vibration center line O. As illustrated in FIG. 6, the spoke portions 24, the ventilation openings 25, and the inner wall portion 26 of the frame member 21 face the inner side of the opening portion 70 that opens in the peripheral portion of the lid portion 27.

As illustrated in FIG. 6, let H1 be the height (the opening height of the opening portion 70) from the upper surface 22a of the flange portion 22 of the frame member 21 to the lower edge portion 27b of the lid portion 27, and let H2 be the height from the upper surface 22a of the flange portion 22 of the frame member 21 to the lower edge portion 25a of the ventilation opening 25 (the height of the inner wall portion 26). Then, H1<H2. That is, in the direction orthogonal to the vibration center line O, the inner wall portion 26 faces the opening portion 70 throughout the entire open region of the opening portion 70.

As illustrated in FIG. 5 and FIG. 7, a plurality of fins 71 are provided in the opening portion 70 at regular intervals along the circumferential direction about the vibration center line O. The lid portion 27 is formed of a synthetic resin material, and the fins 71 are integrally formed on the lid portion 27 so as to protrude inwardly from the inner surface of the inner peripheral portion of the lid portion 27. In addition, the fins 71 are formed so as to further protrude downward from the lower edge portion 27b of the lid portion 27. Thus, the fins 71 face the outer side of the ventilation openings 25 formed in the frame member 21. In addition, the fins 71 are positioned in the opening portion 70.

Figure 8:
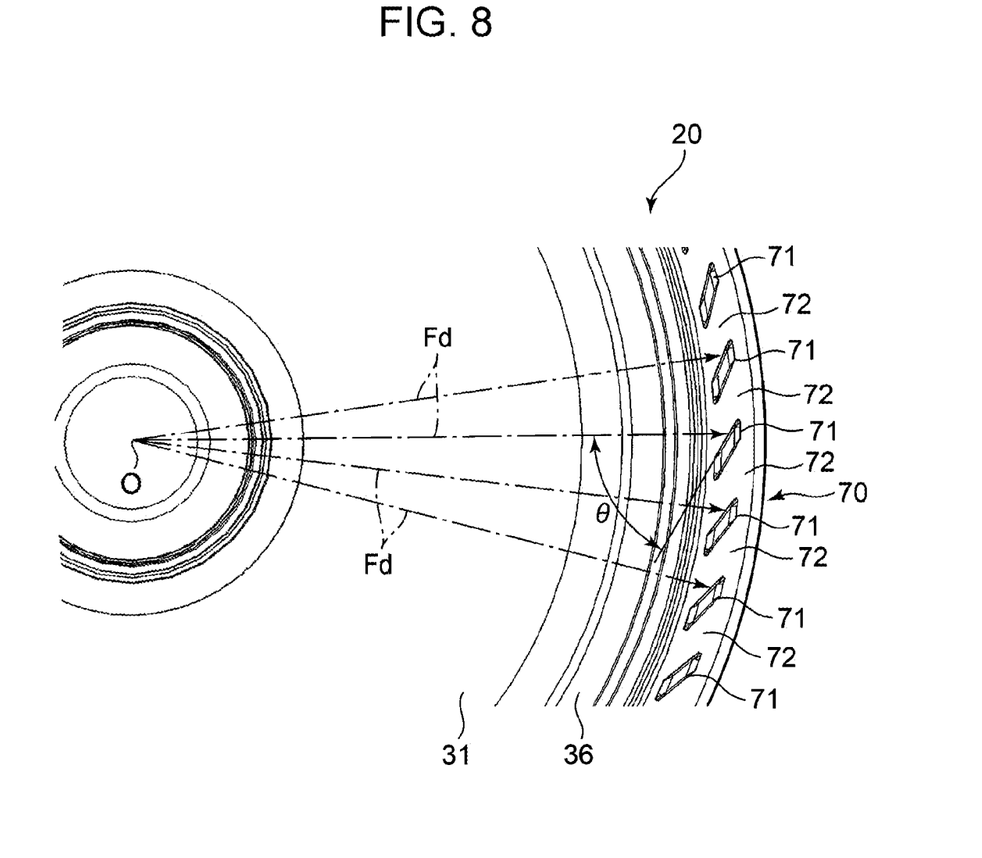
FIG. 8 is a partial enlarged plan cross-sectional view of FIG. 7.

FIG. 7 and FIG. 8 illustrate cross sectional plan views of the fins 71 provided in the opening portion 70. The fins 71 are formed at regular intervals along the lower edge portion 27b of the lid portion 27, and an air passage 72 is formed between every adjacent two of the fins 71. Since in some implementations, the in-vehicle speaker 1 includes the diaphragm 31 having the circular outer peripheral portion, the fins 71 are arranged at regular intervals along a circular arc at the center of which there is the vibration center line O. In addition, the fins 71 are arranged at the same distance from the vibration center line O.

Figure 9:
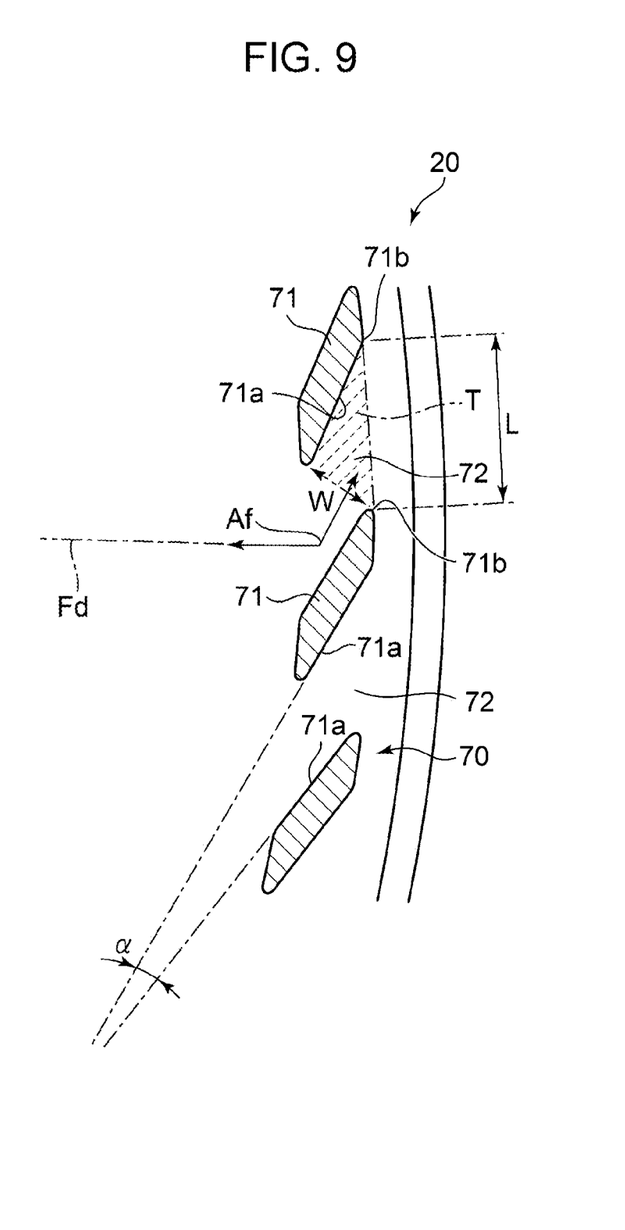
FIG. 9 is an enlarged plan cross-sectional view of the fins and the air passages provided in the opening portion.

In FIG. 8 and FIG. 9, imaginary lines Fd are illustrated. The imaginary line Fd extends in the radial direction from the vibration center line O serving as a starting point to each of the fins 71. Each of the fins 71 extends diagonally at an angle to one of the imaginary lines Fd, and thus, each of the air passages 72 also extends obliquely. Each of the fins 71 is inclined at an angle of $\theta$ to the imaginary line Fd extending in the radial direction from the vibration center line O serving as a starting point. It is desirable that the angle $\theta$ be 45 degrees±15 degrees.

In the case where the peripheral portion of the diaphragm 31 is elliptical or oval in shape, the fins 71 are arranged along the peripheral portion of the elliptical shape or the oval shape. Even in this case, each of the fins 71 is formed so as to be inclined at an angle ($\theta$) to one of the imaginary lines Fd extending in the radial direction from the vibration center line O of the diaphragm 31 having an elliptical or oval shape.

The operation performed by the in-vehicle speaker 1 is described below. In the example of the mounting technique illustrated in FIG. 2, the in-vehicle speaker 1 is mounted inside the cowl box 5 which is part of the non-interior space S2 of the vehicle. Since the opening 5a is formed in the upper portion of the cowl box 5, dust and moisture may easily enter the inside of the cowl box 5. Since the upper portion of the in-vehicle speaker 1 (the front portion in the vibration direction of the diaphragm 31) is covered by the lid portion 27, moisture and dust entering the inside of the cowl box 5 do not reach the diaphragm 31 directly.

Inside the cowl box 5, an opening portion 70 opens at a boundary portion between the first casing portion 10 and the second casing portion 20. At this time, as illustrated in FIG. 6, the height from the upper surface 22a of the flange portion 22 of the frame member 21 to the lower edge portion 25a of the ventilation opening 25 is greater than the height H1 from the upper surface 22a to the lower edge portion 27b of the lid portion 27. In addition, the inner wall portion 26 of the frame member 21 faces the inner side of the opening portion 70. Consequently, even if moisture or dust reaches the opening portion 70 inside the cowl box 5, the moisture or dust does not easily reach the diaphragm 31 directly. As a result, the dust resistance inside the casing of the in-vehicle speaker 1 is improved.

In the in-vehicle speaker 1, the diaphragm 31 are vibrated together with the bobbin 32 in the direction of the vibration center line O by the electromagnetic force caused by the magnetic field traversing the magnetic gap G in the magnetic drive unit 40 and a voice current given to the voice coil 33. At this time, the sound pressure in the sound producing space Sa inside the first casing portion 10 under the diaphragm 31 is transferred into the interior space S1 of the vehicle through the sound emitting port E formed in the first casing portion 10. Thus, a passenger in the interior space S1 of the vehicle can listen to music or sound. By increasing the opening area of the sound emitting port E, a change in the sound pressure in the sound producing space Sa that acts on the diaphragm 31 as vibration resistance, that is, a so-called damper effect can be reduced.

In the antiphase space Sb inside the second casing portion 20 above the diaphragm 31, sound pressure with antiphase to the sound pressure in the sound generation space Sa is generated by the vibration of the diaphragm 31. In the second casing portion 20, since the opening portion 70 is formed throughout the outer circumference portion of the lid portion 27, a change in the sound pressure in the antiphase space Sb produces an airflow, which passes through the opening portion 70. By ensuring that the opening height H1 of the opening portion 70 is relatively large, the resistance of the airflow can be reduced. Thus, the so-called damper effect of giving a resistance force to the vibration of the diaphragm 31 can be reduced. In addition, the opening portion 70 has, thereinside, the inner wall portion 26 of the frame member 21 that faces the opening of the opening portion 70 with a gap therebetween. In this manner, even when the opening height H1 of the opening portion 70 is made relatively large, moisture and dust can be effectively prevented from entering the antiphase space Sb.

The airflow generated by the change in the sound pressure in the antiphase space Sb passes through the ventilation openings 25 formed in the frame member 21, the gap between the frame member 21 and the lid portion 27, and the opening portion 70. At this time, air flow noise is generated by the airflow. This air flow noise is transferred into the interior space S1 of the vehicle, which is problematic. In some implementations of the in-vehicle speaker 1, the fins 71 and the air passages 72 face the ventilation opening 25 of the frame member 21 from the outside, and the fins 71 and the air passages 72 are also formed in the opening portion 70. As a result, the air flow noise can be reduced.

Figure 11:
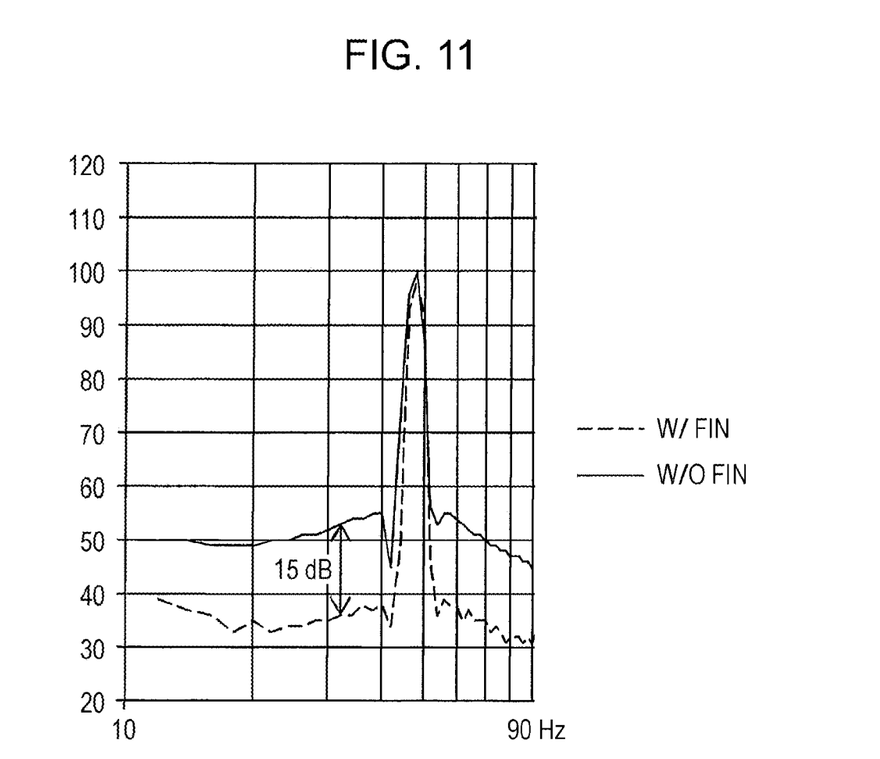
FIG. 11 is a graph for comparing air flow noise generated in the implementation in which fins and air passages are provided with that in a comparative example in which fins are provided.

In FIG. 11, the abscissa represents the vibration frequency (Hz) of the diaphragm 31, and the ordinate represents the level (dB) of the sound pressure measured in the vicinity of the opening portion 70. The solid line graph illustrated in FIG. 11 indicates a change in the sound pressure level of a comparative example without the fins 71, and the broken line graph indicates a change in the sound pressure level of the in-vehicle speaker 1 having the fins 71 according to the implementation. In both the in-vehicle speakers of the comparative example and the implementation, the diameter of the diaphragm 31 is 180 mm, the opening height H1 of the opening portion 70 illustrated in FIG. 6 is 10 mm, and the height H2 to the ventilation opening 25 of the frame member 21 is 11 mm. In the in-vehicle speaker 1 according to the implementation, 48 fins 71 are provided. In FIG. 8, the angle θ formed by each of the fins 71 and the corresponding imaginary line Fd is 60 degrees. In FIG. 9, the width of the fin 71 is 2 mm, and the length of the fin 71 is 10 mm. In FIG. 6, the height (the length) of the fins 71 in the vertical direction is 15 mm.

In the measurement illustrated in FIG. 11, a voice signal of 45 Hz is applied to the voice coil 33. The sound pressure level due to the amplitude of the diaphragm 31 has a maximum peak at 45 Hz. In FIG. 11, the sound pressure level in the region where the peak does not appear represents the magnitude of the air flow noise. As can be seen from FIG. 11, according to the implementations in which the fins 71 are provided, the air flow noise is reduced by up to about 15 dB, as compared with the comparative example in which the fins 71 are not provided.

If the fins 71 are provided, the airflow passing through the ventilation openings 25 and further passing through the opening portion 70 is split into a plurality of airflows in the air passages 72 partitioned by the fins 71. Thus, the flow rate in each of the air passages 72 can be reduced. Therefore, the air flow noise can be reduced when the airflow moves back and forth in a path in which the airflow passes through the ventilation opening 25, turns its direction downward, and reaches the outside through the opening portion 70.

As can be seen from the enlarged views in FIG. 8 and FIG. 9, each of the fins 71 facing the ventilation openings 25 and the fins 71 located in the opening portion 70 is at an angle to the corresponding imaginary line Fd extending in the radial direction from the vibration center line O. Each of the air passages 72 between every adjacent two of the fins 71 is obliquely at an angle to the imaginary line Fd. Consequently, as illustrated in FIG. 9, when an airflow Af flowing along the imaginary line Fd enters the obliquely disposed air passage 72, the flow rate further decreases, and the air flow noise is further reduced.

The reason why the air flow noise caused by the sound pressure is reduced by passing the airflow through the air passage 72 between the adjacent fins 71 is described below.

That is, as illustrated in FIG. 9, the airflow Af flowing along the imaginary line Fd is bent by a facing inner surface 71a of the fin 71 and, thus, the flow rate is decreased. Consequently, the shearing force between the facing inner surface 71a and the airflow is reduced. As a result, the generation of air flow noise is prevented. In addition, as illustrated in FIG. 9, in the air passage 72, let W be the smallest facing distance between the facing inner surfaces 71a of the adjacent fins 71, and let L be the facing distance between the facing inner surfaces 71a at an outer end portions 71b at which the airflow is brought into contact with the non-interior space S2 of the vehicle through the opening portion 70. Then, L>W. As a result, as illustrated in FIG. 9, a triangular area T is formed in an area of the air passage 72 at which the air passage 72 is in contact with the non-interior space S2 of the vehicle. This area functions as a bell-mouth. Thus, the occurrence of air vortices can be reduced at the portion 71b (i.e., the outer end portion 71b of the facing inner surface 71a) at which the airflow flows from an area T into the non-interior space S2 of the vehicle. As a result, the air flow noise is further decreased.

Furthermore, as illustrated in FIG. 9, the facing distance between the facing inner surfaces 71a of the two fins 71 located on either side of the air passage 72 gradually decreases toward the inside of the second casing portion 20. In FIG. 9, an angle α indicates the gradual decrease in facing distance. As described above, the facing distance of the facing inner surfaces 71a on either side of the air passage 72 increases toward the outside of the second casing portion 20. Thus, the air passage 72 functions as a bell-mouth. As a result, the air flow noise can be reduced.

Figure 10A:
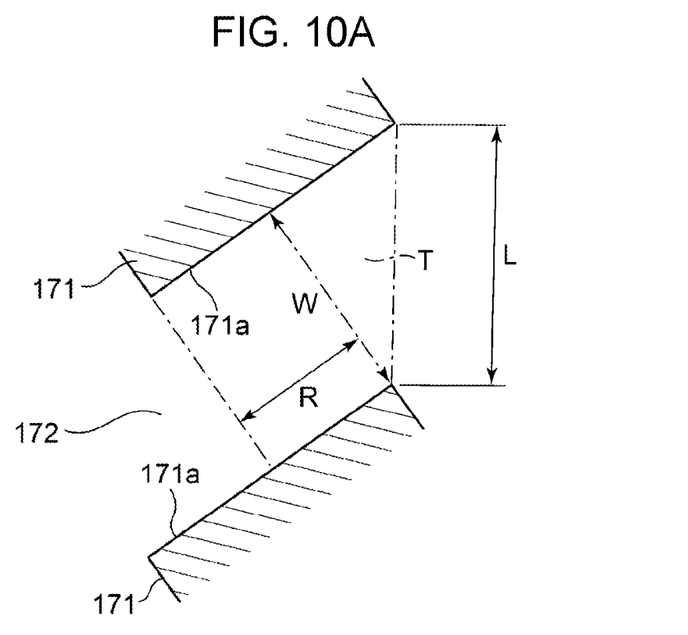
FIGS. 10A and 10B are enlarged plan cross-sectional views of fins and air passages of another form of the present disclosure.
Figure 10B:
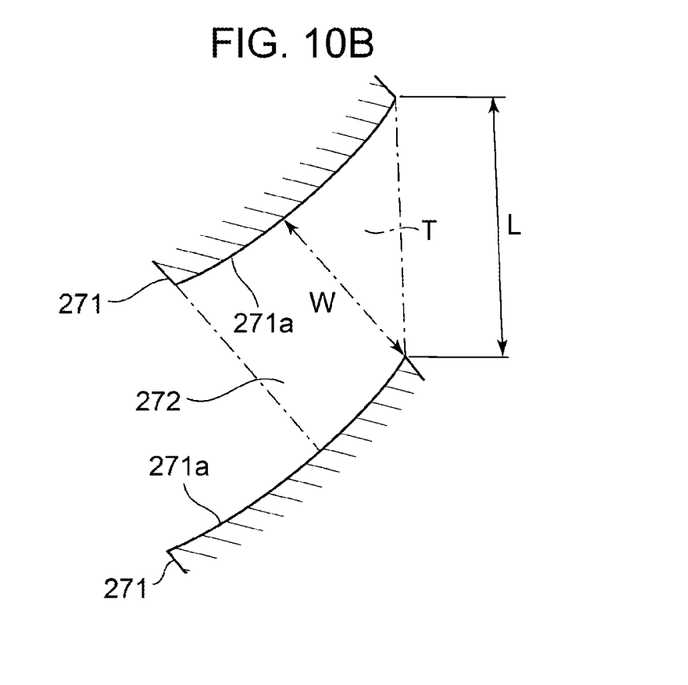

FIGS. 10A and 10B illustrate fins and air passages according to other implementations. In the example illustrated in FIG. 10A, facing inner surfaces 171a of fins 171 located on either side of an air passage 172 face each other within the range defined by a distance R, and the length of the facing portion of the facing inner surface 171a is increased. Even in such a structure, a triangular area T can be formed in an area of the air passage 172 that communicates with the non-interior space of the vehicle. In the example illustrated in FIG. 10B, at least part of a facing inner surface 271a of each of fins 271 positioned on either side of an air passage 272 is curved. Even in such a structure, a triangular area T can be formed in an area of the air passage 272 that communicates with the non-interior space of the vehicle.

Note that as another shape of the fins and the air passages, part of each of the fins (the air passages) that extends toward the inside of the casing may be parallel to the imaginary line Fd, and the other part of the fins (the air passages) that extends toward the outside of the casing may be at an angle to the imaginary line Fd.

It is intended that the foregoing detailed description be regarded as illustrative rather than limiting, and that it be understood that it is the following claims, including all equivalents, that are intended to define the spirit and scope of this disclosure.

What is claimed is:

1. An in-vehicle speaker comprising:
   a casing;
   a frame member enclosed in the casing;
   a diaphragm enclosed in the casing, where the frame member supports an outer peripheral portion of the diaphragm; and
   a magnetic drive unit configured to drive the diaphragm,
   wherein the inside of the casing is separated into a sound producing space and an antiphase space by the diaphragm serving as a boundary, and the casing is composed of a first casing that forms the sound producing space therein and a second casing that forms the antiphase space therein,
   wherein the first casing has a sound emitting port that enables the sound producing space to communicate with an interior space of a vehicle,
   wherein the second casing includes a lid portion located at the antiphase space side to cover the diaphragm and an opening portion that opens along a peripheral portion of the lid portion, and the opening portion enables the antiphase space to communicate with a non-interior space of the vehicle,
   wherein a plurality of fins is arranged at intervals in the opening portion along the peripheral portion of the lid portion, an air passage is formed between every adjacent two of the fins, and at least part of the air passage extends at an angle, in a lateral direction, to an imaginary line extending from the center of the diaphragm in a radial direction,
   wherein a facing inner surface of each of the fins located on either side of the air passage has an outer end portion adjacent to the non-interior space of the vehicle, and
   wherein a facing distance L between the outer end portions of the facing inner surfaces is greater than a smallest facing distance W between the facing inner surfaces.

2. The in-vehicle speaker according to claim 1, wherein at least part of a facing inner surface of each of the fins located on either side of the air passage is curved from an inside of the second casing toward the non-interior space of the vehicle.

3. The in-vehicle speaker according to claim 1, wherein the angle is between 30 degrees and 60 degrees.

4. An in-vehicle speaker comprising:
   a casing;
   a frame member enclosed in the casing;
   a diaphragm enclosed in the casing, where the frame member supports an outer peripheral portion of the diaphragm; and
   a magnetic drive unit configured to drive the diaphragm,
   wherein the inside of the casing is separated into a sound producing space and an antiphase space by the diaphragm serving as a boundary, and the casing is composed of a first casing that forms the sound producing space therein and a second casing that forms the antiphase space therein,
   wherein the first casing has a sound emitting port that enables the sound producing space to communicate with an interior space of a vehicle,
   wherein the second casing includes a lid portion located at the antiphase space side to cover the diaphragm and an opening portion that opens along a peripheral portion of the lid portion, and the opening portion enables the antiphase space to communicate with a non-interior space of the vehicle,
   wherein a plurality of fins is arranged at intervals in the opening portion along the peripheral portion of the lid portion, an air passage is formed between every adjacent two of the fins, and at least part of the air passage extends at an angle, in a lateral direction, to an imaginary line extending from the center of the diaphragm in a radial direction;
   wherein both facing inner surfaces of the fins located on either side of the air passage are flat surfaces; and
   wherein a facing distance between the facing inner surfaces gradually increases from an inside of the second casing toward the non-interior space of the vehicle.

* * * * *